United States Patent [19]

Milhous

[11] 4,366,530

[45] Dec. 28, 1982

[54] UNITARY FRONT LIGHT MOUNTING ASSEMBLY FOR A VEHICLE

[75] Inventor: Brian B. Milhous, San Jose, Calif.

[73] Assignee: Paccar Inc., Bellevue, Wash.

[21] Appl. No.: 205,582

[22] Filed: Nov. 7, 1980

[51] Int. Cl.³ .............................................. B60Q 1/00
[52] U.S. Cl. ..................................... 362/80; 362/365; 362/373
[58] Field of Search ...................... 362/74, 80, 82, 83, 362/365, 373; 236/35.3

[56] References Cited

U.S. PATENT DOCUMENTS 3,196,265 7/1965 Schneider ............................. 362/82
3,498,538 3/1970 Mitchell ................................ 362/80
4,194,236 3/1980 Pettersson ............................ 362/83

Primary Examiner—Donald P. Walsh
Attorney, Agent, or Firm—Owen, Wickersham & Erickson

[57] ABSTRACT

A unitary assembly for a headlight and other lights at the front of a vehicle, particularly a large truck, has an integral housing with mountings for the headlight and other lights at each side of the vehicle's front. The housing is secured at the back side of the vehicle's front skirt or other front surface, positioned so that the headlamp is aimed through an opening provided in the front surface of the vehicle. The housing also provides a mounting for the turn signal light, positioned below the headlight, and preferably also for a side marker light and a reflector. In a preferred embodiment, the unitary assembly at one side of the vehicle includes an air inlet in the portion of the housing immediately surrounding the headlamp. The air inlet is for taking in air for the interior of the cab or for an air conditioner or heater.

10 Claims, 6 Drawing Figures

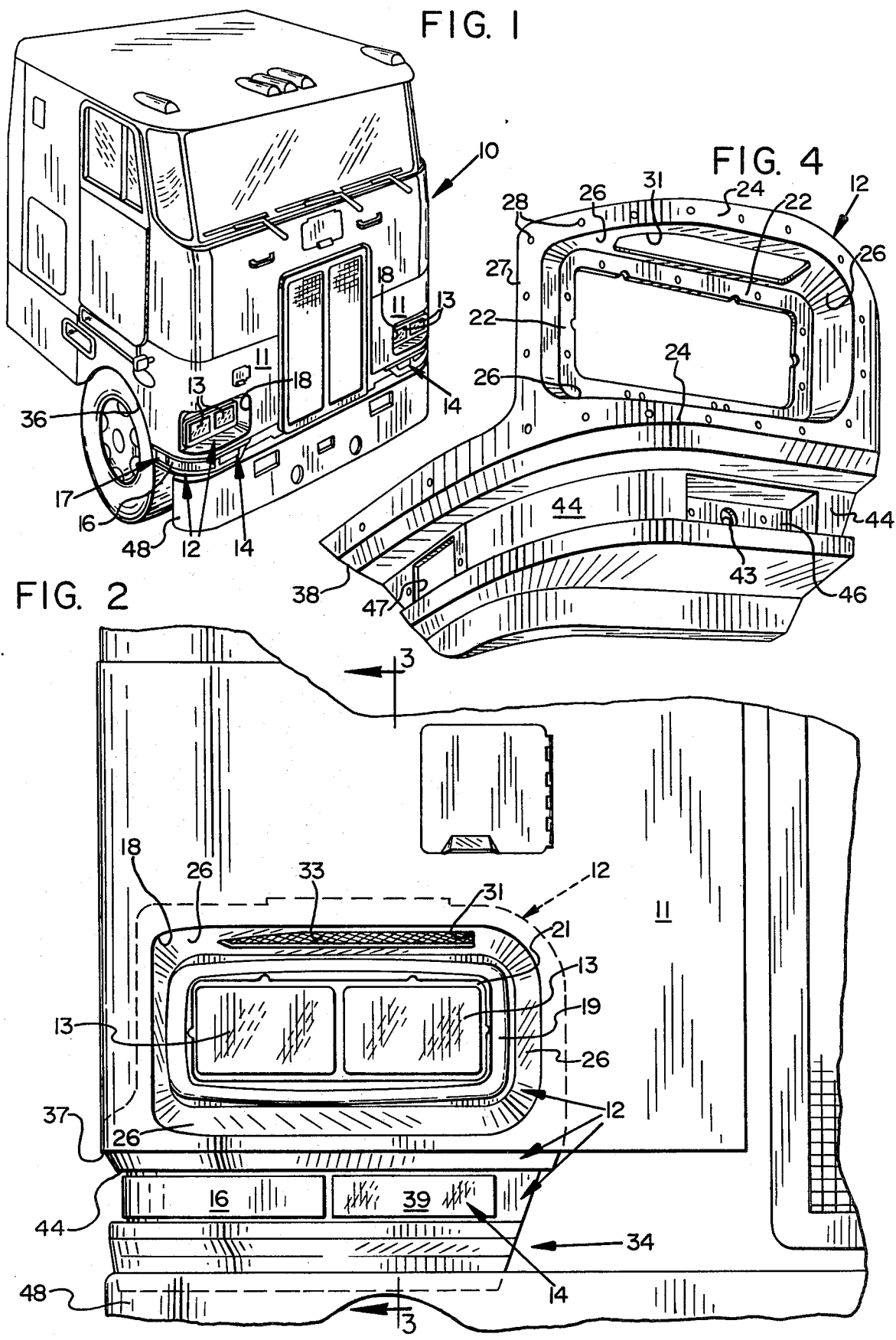

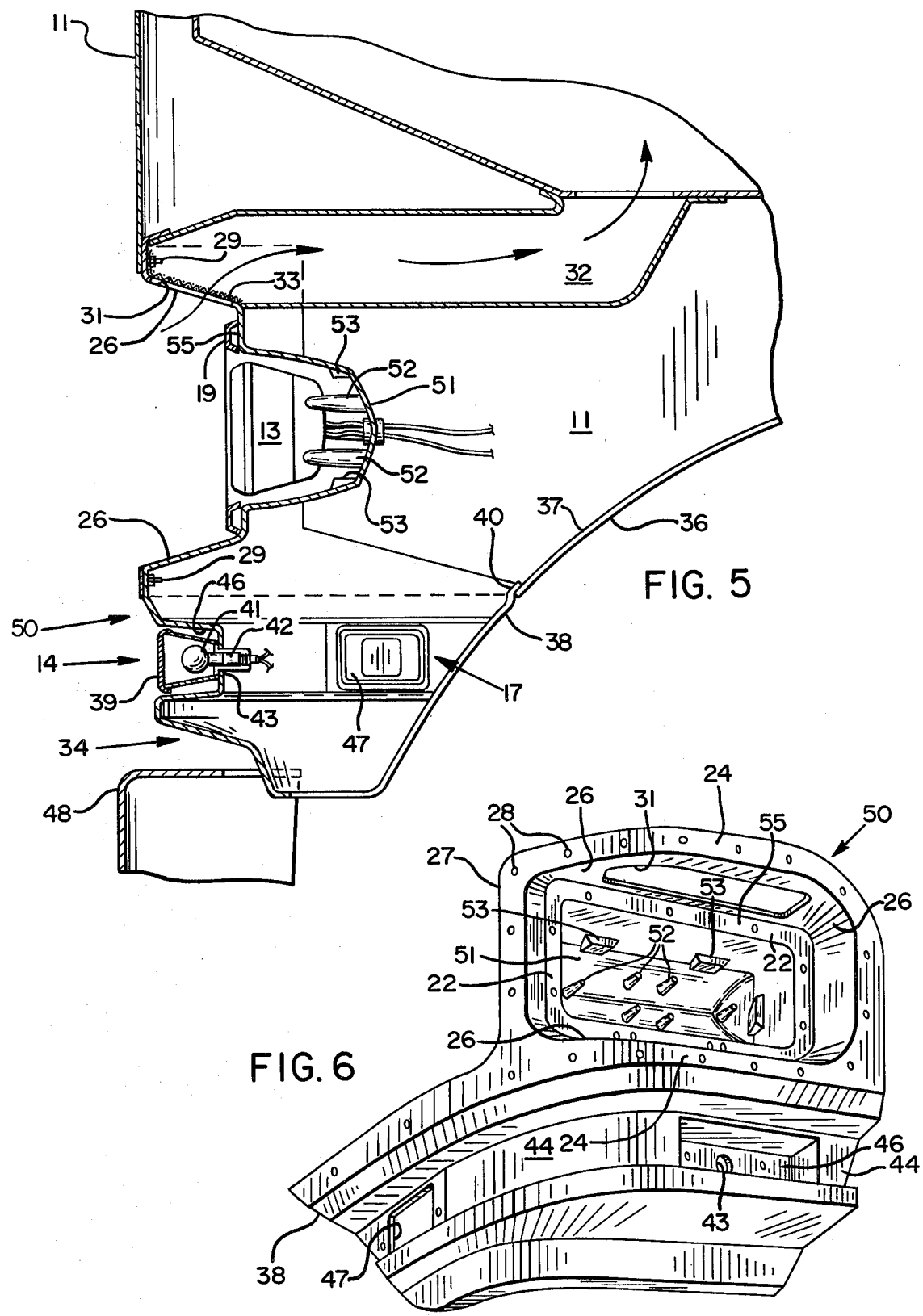

UNITARY FRONT LIGHT MOUNTING ASSEMBLY FOR A VEHICLE

BACKGROUND OF THE INVENTION

The invention relates to vehicle front lights and reflectors, and more particularly to a unitary assembly for mounting, on each side of a vehicle front, the headlight or headlights, turn signal, and other lights and reflectors, if desired.

Numerous different mounting arrangements have been suggested and used for vehicle headlights, turn signal lights, reflectors, side marker lights and other front lights. For example, see U.S. Pat. Nos. 3,639,748, 3,090,858 and 3,032,645. U.S. Pat. No. 3,498,538 shows an automobile headlight mounting system with an air inlet in the vicinity of the headlamps. While these prior arrangements have been satisfactory, they have not provided a particularly efficient means for installing the various lights or of maintaining or replacing them. Typically, a mounting unit is provided for each individual light or reflector, to be connected by screws or other fasteners to the vehicle body. Access to the lights from the rear is often difficult or cumbersome, and in the original assembly of the vehicle, each light with its accompanying mounting unit must be separately assembled on the vehicle body.

There has been a general need for a more efficient system of mounting a plurality of lights at each side of a vehicle front, particularly when there are a number of lights at each side, such as headlights, turn signal/parking light, reflector, and side marker light. Particularly in the case of large trucks, there has been a need for a unitary arrangement for mounting all of the lights together, and for connecting them efficiently as a single unit onto the body of the vehicle. Prior to the present invention, no such efficient arrangement was available.

SUMMARY OF THE INVENTION

The present invention provides a unitary assembly for a headlight and other lights at the front of a vehicle, particularly a large truck, wherein openings are provided in the front skirt or surface of the vehicle for the headlights. The assembly comprises, for each side of the vehicle front, an integral housing with means for mounting the housing generally above the vehicle's bumper and at the back side of the headlight opening. Mounting means are provided on the housing for securing one or more headlights, aimed forwardly through the opening in the front surface of the vehicle. Additionally, further mounting means are provided in the housing for securing a turn signal light below the headlight.

In a preferred embodiment of the invention, the unitary assembly also includes a portion facing to the side, with provision for mounting side marker lights in the side-facing portion. These lights face parallel traffic, in line with the turn signal light, for better visibility to crossing motorists. The housing also preferably retains a reflex type reflector below the headlight, outboard of the turn signal light, and this reflector may be curved to wrap around the front corner of the vehicle from the front to the side. The reflex reflector thus provides a reflective surface from nearly any angle. A protective cover is connected to the rear side of the housing for preventing water, mud, etc., from accumulating on the rear side of the headlight.

Preferably, particularly in the case of a large truck having a relatively flat front skirt portion, the unitary assembly is so arranged that the headlights are aimed through the opening in the skirt, but the skirt terminates just below this opening, and the turn signal light, side marker light and reflector are positioned to be exposed below the bottom edge of the skirt. Thus, at the side the housing continues the curvature of the wheel well and at both front and side, the exposed portions of the assembly appear integral with the truck body.

One preferred feature is that, at one side of the vehicle front, the housing includes an air inlet opening for communication with a duct leading to the heater or air conditioning unit, or simply to the interior of the vehicle. Such an opening may be provided by recessing walls in the vicinity of the housing immediately surrounding the headlight, setting the headlight back from the front skirt of the truck. One of the recessing walls, preferably the upper one, includes the air opening, with appropriate screening. On large trucks, particularly cab-over-engine type tractors, this eliminates the usual positioning of a screened air inlet opening in the face of the front skirt. There are several disadvantages to location of the air opening in the flat surface of the front panel, one of which is that such trucks are often painted with the insignias or color patterns of a particular freight line, and the air opening imposes an interruption in the pattern. The location of the air inlet and the recessed wall surrounding the headlight eliminates this and other problems and provides an inconspicuous, aesthetically pleasing appearance.

It is therefore among the objects of the invention to provide a unitary assembly for headlights, turn signals and other lights at the front of the vehicle, such as a large truck, which supports and contains all the lights at each side of the vehicle in one module, providing for ease and economy of the initial assembly and efficiency in maintenance and replacement of lights. A further object is to locate the air inlet for fresh air to the vehicle interior or to the heater or air conditioner within the unitary light assembly, so that it is inconspicuous and efficient in design. These and other objects, features and advantages of the invention will be apparent from the following description of a preferred embodiment, taken in conjunction with the accompanying drawings.

DESCRIPTION OF THE DRAWINGS

FIG. 1 is a perspective view showing a cab-over-engine type truck incorporating the unitary headlight assembly of the invention.

FIG. 2 is a front elevational view of a portion of the truck showing the assembly as installed in the truck.

FIG. 4 is a perspective view of the assembly itself, removed from the vehicle, and showing the unit incorporating an air inlet.

FIG. 5 is a view similar to FIG. 3, but showing an alternative form of the invention with headlight mounting unit and nacelle integral with the headlight unit.

FIG. 6 is a view similar to FIG. 4, but showing the unitary nacelle arrangement of FIG. 5.

DESCRIPTION OF A PREFERRED EMBODIMENT

Figure 3:
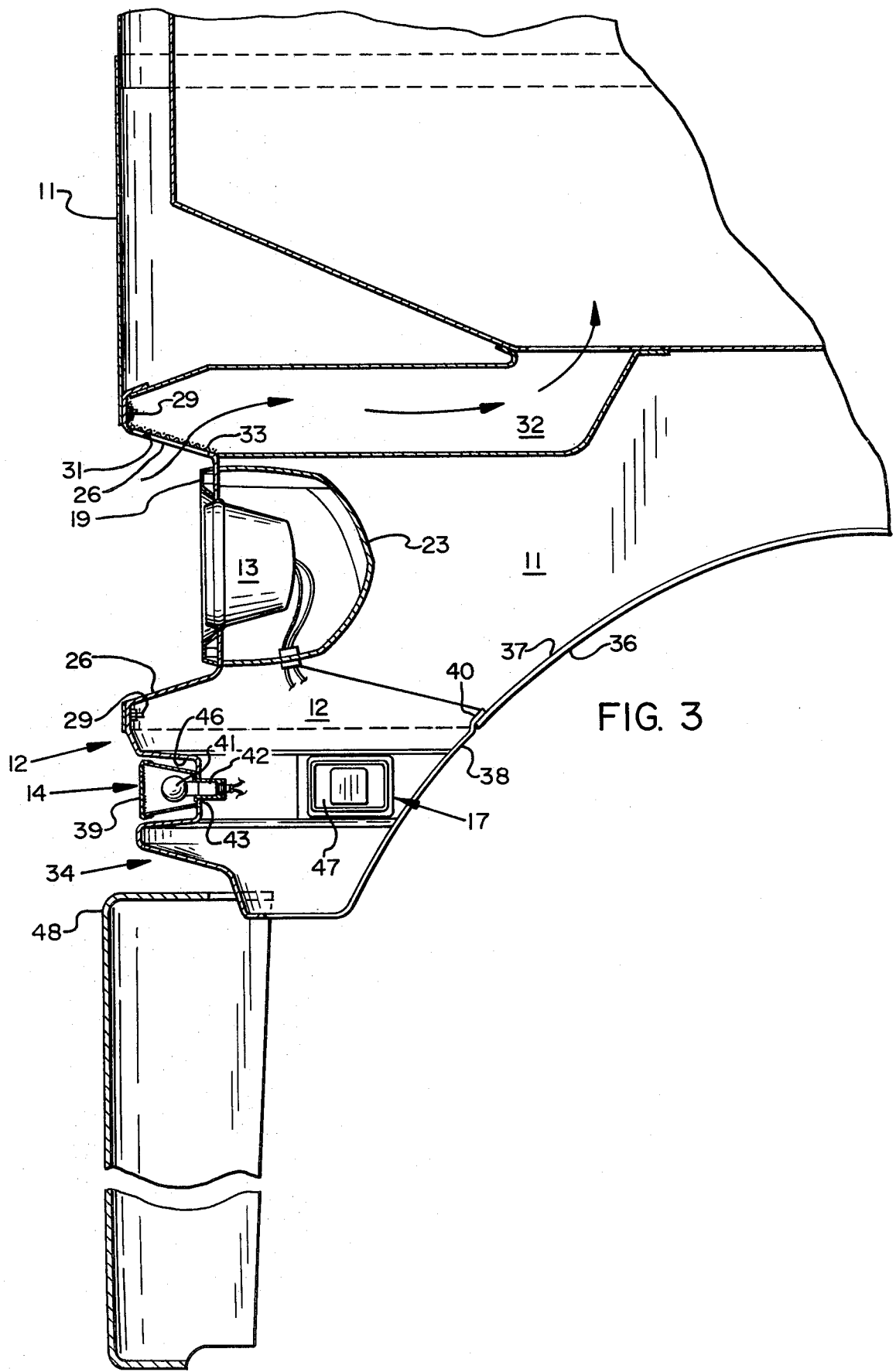
FIG. 3 is a sectional side elevation view of the assembly in the truck, taken along the line 3—3 of FIG. 2.

In the drawings, FIG. 1 shows a cab-over-engine type truck tractor 10 having a front skirt portion 11 at each side, preferably curving around integrally to the side as shown. Connected to and supported by the skirt 11 at each side is an integral assembly 12 which supports headlights 13, a directional light (turn signal) 14, a reflex reflector 16, which follows the curve around to the side, and a side marker light 17. As indicated, dual headlamps 13 may be provided, but the invention is equally applicable to single headlamps. An opening 18 is provided in each side of the skirt 11, and the integral lighting unit 12 is mounted on the skirt behind this opening, such that the headlights 13 are aimed forward through the opening.

FIGS. 2 and 3 show the unit 12, as mounted in the truck 10, in greater detail, while FIG. 4 shows the mounting unit before its installation in the truck. As FIGS. 2 and 3 indicate, the headlamp or headlamps 13 may be immediately surrounded at the front exterior by a decorative and protective bezel 19. The headlamps 13 are mounted by conventional means to a mounting unit 23 which also serves as a protective nacelle. The unit 23 is secured at the back side of an inner flange 22 of the unit 12.

The integral mounting unit 12 may be injection molded with impact plastic, or formed by fiberglass reinforced plastic, or cast in aluminum, or formed in sheet metal, and prior to installation of the various lights, lenses, reflector, etc., the unit is shaped essentially as shown in FIG. 4. The flange 12 is recessed from peripheral flanges 24 by obliquely angled recessing walls 26, located generally on three sides of the headlamps. At the outboard side of the unit, indicated at 27 in FIG. 4, there is no recess but the approximate plane of mounting of the lights 13 meets the side of the curving skirt portion 11, as can be envisioned from FIGS. 1 and 4.

The integral mounting unit 12, as shown in FIG. 4, includes a series of holes 28 in the peripheral flange 27 for securing the mounting unit 12 to the back side of the front skirt 11 or other front surface of a vehicle, by appropriate fasteners 29.

As shown in FIGS. 2, 3 and 4, the unitary mounting unit 12 may include an opening 31 for admission of fresh air into a duct 32 for delivery to a heater or air conditioner, or simply into the interior space of the vehicle. As discussed previously, the location of the air inlet opening 31 in the upper recessing wall 26 of the mounting unit 12 is advantageous and is an efficient means of providing an air inlet. One or both of the left and right mounting units 12 may include an air inlet, but in the case of a large cab-over-engine type truck 10 as illustrated in these drawings, the air inlet at one side is sufficient, and it may be on the right side as indicated. Positioned over the opening 31, at the inside, is a patch of screening material 33, for preventing the entry of large particles from the road, bugs, etc., into the air duct 32.

A lower portion 34 of the unitary light mounting assembly 12 hangs below the bottom of the front skirt 11, as best seen in FIGS. 2 and 3. This lower portion, whose side, as illustrated in FIG. 3, is shaped to generally continue the contour of the wheel opening 36 of the front skirt 11, is supported in part by a turned-in edge 37 of the front skirt at the wheel opening, as shown. An offset portion 40 at the end of a curved edge 38 of the lower portion 34 is received under the skirt edge 37, and this stabilizes and partially supports the lower portion 34 of the unit. The lower portion 34 supports the directional light 14, which includes a front lens 39, a lamp 41 and supporting structure 42 which preferably snaps into an opening 43 (see also FIG. 4) in the conventional manner.

As indicated particularly in FIGS. 1 and 2, the lower portion 34 of the assembly supports the arcuate reflex reflector 16 which is connected to the housing 12 in any suitable manner. The reflector 16 resides in a recess 44 which is somewhat shallower than a recess 46 provided for the adjacent directional light 14. The lower portion 34 of the housing also supports, in a recess or opening 47, the side marker light 17, which is side-facing and adjacent to the wheel opening 36.

As illustrated in FIGS. 1, 2 and 3, the lower portion 34 of the integral light mounting unit 12 may extend a short distance lower than the top of the vehicle's bumper 48, and thus fills the space between the bumper and the front skirt portion 11, preventing mud, snow and other debris from being thrown through this space, while also providing a pleasing appearance. Similarly, at the side of the vehicle, the lower portion 34 of the housing 12 continues the curving line of the wheel opening 36, as discussed above. The unit 12 therefore constitutes an efficient arrangement for lending continuity to the aesthetics of the truck cab 10 while also conveniently and economically mounting a plurality of lights and a reflector in one module, for fast and efficient initial assembly and later servicing and maintenance. For removal of the entire unit, the fasteners 29 need only be removed from around the periphery of the headlight recess area, with wire connections appropriately unfastened, and the unit 12 may be released from the skirt edge 37 and removed.

FIGS. 5 and 6 show, in views respectively similar to FIGS. 3 and 4, an alternate form of front light mounting unit 50. This embodiment includes an integrally formed headlight mounting unit 51 somewhat similar to the earlier described unit 23, and also serving as a protective nacelle. Six studs 52 project forward from the rear wall surface of the nacelle for mounting the headlamps 13 and allowing for aim adjustment. The contacting tips of the studs are of spherical radius and provide for lateral and vertical adjustment. The mounting hardware is conventional and does not form a part of the invention. The hardware is not shown, except that molded bosses 53 for cooperation with the hardware are indicated in the nacelle 51.

The bezel 19 is the same as in the first embodiment, and is mounted to a surface 55 similar in position to the flange 22 of FIGS. 3 and 4.

To those skilled in the art to which this invention relates, many changes in construction and widely differing embodiments and applications of the invention will suggest themselves without departing from the spirit and scope of the invention. The disclosures and the description herein ae purely illustrative and are not intended to be in any sense limiting.

I claim:

1. A unitary mounting device for a headlight and other lights at the front of a cab-over-engine type truck cab wherein openings are provided in the front skirt of the cab for the headlights, comprising:

an integral housing and means for mounting the housing on the front skirt of the cab, at one side at the front of the cab, generally above the position of the cab's bumper and generally at the back side of one of the openings in the cab's front skirt;

first mounting means associated with the housing for securing at least one headlight to the housing, aimed forwardly through said opening in the cab's front skirt; and second mounting means in the housing for securing a turn signal light, below the headlight, whereby the lights may be assembled to the housing, forming a completed unit, then the completed unit may be secured to the cab's front skirt.

2. A mounting device according to claim 1 wherein the housing includes a portion facing generally to the side, at the level of the second mounting means, and including in the side-facing portion third mounting means for securing a side-facing side marker light.

3. A mounting device according to claim 1 or 2 wherein the housing further includes a reflector mounting means generally below the headlight and outboard of the turn signal light, said reflector and its mounting means being curved and extending generally horizontally from the front to the side of the vehicle.

4. A mounting device according to claim 1, wherein the first mounting means includes a mounting unit connected to the rear side of the housing.

5. A mounting device according to claim 1, wherein the first mounting means includes a mounting unit at the rear side of the housing, integral with the housing.

6. A mounting device according to claim 1 wherein the second mounting means is so arranged to position the turn signal light below the bottom edge of the front skirt, just above the cab's bumper.

7. A mounting device according to claim 1 wherein the first mounting means is at a recessed position in the housing behind the vehicle's front surface, with recessing walls extending from the front of the housing back to the first mounting means, and wherein one recessing wall of the housing includes an air inlet between the vehicle's front surface and the first mounting means.

8. A mounting device according to claim 7 wherein said one recessing wall is above the headlight position.

9. In combination with a cab-over-engine type truck cab having a front skirt with openings provided for headlights, a unitary front light mounting assembly for a headlight and other lights at one side of the front of the cab, comprising:

an integrally-formed housing secured to the front skirt of the cab at one side of the front of the cab, generally above the position of the cab's bumper and generally at the back side of one of the openings in the cab's skirt;

at least one headlight associated with the unitary assembly;

first mounting means associated with the housing for securing the headlight to the housing, aimed forwardly through said opening in the cab's front skirt; and a turn signal light associated with the unitary assembly;

second mounting means in the housing for securing a turn signal light below the bottom edge of the front skirt, just above the cab's bumper, whereby the lights may be assembled to the cab by first assembling the lights to the housing to form a completed lighting unit, then securing the completed unit secured to the cab's front skirt.

10. A mounting device according to claim 9 wherein the first mounting means is at a recessed position in the housing behind the vehicle's front surface, with recessing walls extending from the front of the housing back to the first mounting means, and wherein one recessing wall of the housing includes an air inlet between the vehicle's front surface and the first mounting means.

* * * * *